US012786867B2

(12) United States Patent
Pantelidou et al.

(10) Patent No.: US 12,786,867 B2
(45) Date of Patent: Nov. 3, 2026

(54) ENERGY SAVING IN MOBILE COMMUNICATION SYSTEMS

(71) Applicant: Nokia Solutions and Networks Oy, Espoo (FI)

(72) Inventors: Anna Pantelidou, Massy (FR); Hakon Helmers, Massy (FR); Peter Rost, Munich (DE)

(73) Assignee: Nokia Solutions and Networks, Espoo (FI)

( * ) Notice: Subject to any disclaimer, the term of this patent is extended or adjusted under 35 U.S.C. 154(b) by 254 days.

(21) Appl. No.: 18/578,213

(22) PCT Filed: Jul. 15, 2022

(86) PCT No.: PCT/EP2022/069902
§ 371 (c)(1),
(2) Date: Jan. 10, 2024

(87) PCT Pub. No.: WO2023/011890
PCT Pub. Date: Feb. 9, 2023

(65) Prior Publication Data

US 2024/0323835 A1 Sep. 26, 2024

(30) Foreign Application Priority Data

Aug. 4, 2021 (FI) ..................................... 20215837

(51) Int. Cl.

| | |
|---|---|
| ***H04W 52/00*** | (2009.01) |
| ***H04W 24/02*** | (2009.01) |
| ***H04W 28/086*** | (2023.01) |
| ***H04W 52/02*** | (2009.01) |
| ***H04W 72/52*** | (2023.01) |

(52) U.S. Cl.
CPC ....... *H04W 52/00* (2013.01); *H04W 28/0861* (2023.05); *H04W 52/0206* (2013.01);
(Continued)

(58) Field of Classification Search
CPC . H04W 76/28; H04W 72/52; H04W 52/0274; H04W 28/08
See application file for complete search history.

(56) References Cited

U.S. PATENT DOCUMENTS 9,807,687 B2 10/2017 Awoniyi-Oteri et al.
9,838,981 B2 12/2017 Park et al.
(Continued)

FOREIGN PATENT DOCUMENTS

CN 112804739 A * 5/2021 ........ H04W 52/0206
CN 112954776 A 6/2021
(Continued)

OTHER PUBLICATIONS

"Environmental Engineering (EE); Assessment of mobile network energy efficiency", ETSI ES 203 228, V1.3.1, Oct. 2020, pp. 1-37.
(Continued)

*Primary Examiner* — Rafael Pérez-Gutiérrez
(74) *Attorney, Agent, or Firm* — Barta Jones, PLLC

(57) ABSTRACT

An apparatus, method and computer program is described comprising: receiving a first energy saving report from a local node in control of a first layer of a mobile communication system, wherein the first energy saving report comprises load and timing information relating to the first layer, generating an energy saving decision for the first layer, wherein the energy saving decision comprises an energy saving pattern for the first layer and a qualification for the decision; and providing the energy saving decision to said local node in control of said first layer.

11 Claims, 6 Drawing Sheets

(52) U.S. Cl.
CPC ............ *H04W 24/02* (2013.01); *H04W 72/52* (2023.01); *Y02D 30/70* (2020.08)

(56) References Cited

U.S. PATENT DOCUMENTS

| | | | |
|---|---|---|---|
| 10,070,362 B2 | 9/2018 | Kwan | |
| 2013/0286917 A1 | 10/2013 | Jia et al. | |
| 2014/0194110 A1 | 7/2014 | Suerbaum et al. | |
| 2020/0329428 A1 | 10/2020 | Chou et al. | |
| 2020/0396638 A1 | 12/2020 | Huang et al. | |
| 2024/0214926 A1* | 6/2024 | Karaki | H04W 52/0206 |
| 2026/0006547 A1* | 1/2026 | Chen | H04W 52/0206 |

FOREIGN PATENT DOCUMENTS

| | | | | |
|---|---|---|---|---|
| JP | 2025-524938 A * | 8/2025 | H04W 36/165 |
| WO | 2021/011131 A1 | 1/2021 | |
| WO | 2021/047781 A1 | 3/2021 | |
| WO | 2021/083230 A1 | 5/2021 | |
| WO | WO-2021088766 A1 * | 5/2021 | H04W 52/0206 |

OTHER PUBLICATIONS

"Revised SID: Study on enhancement for data collection for NR and ENDC", 3GPP TSG RAN Meeting #89e, RP-201620, Agenda: 9.7.13, CMCC, Sep. 14-18, 2020, 4 pages.

Klaine et al., "A Survey of Machine Learning Techniques Applied to Self-Organizing Cellular Networks", IEEE Communications Surveys & Tutorials, vol. 19, No. 04, Jul. 17, 2017, pp. 2392-2431.

"5G; NR; Overall description; Stage-2 (3GPP TS 38.300 version 15.8.0 Release 15)", ETSI TS 138 300, V15.8.0, Jan. 2020, 102 pages.

"3rd Generation Partnership Project; Technical Specification Group Radio Access Network; Study on RAN-centric data collection and utilization for LTE and NR (Release 16)", ATIS 3GPP 37.816, V16.0.0, Jul. 2019, pp. 1-35.

Office action received for corresponding Finnish Patent Application No. 20215837, dated Jan. 31, 2022, 12 pages.

"3rd Generation Partnership Project; Technical Specification Group RAN; Evolved Universal Terrestrial Radio Access (E-UTRA) and NR; Study on enhancement for Data Collection for NR and EN-DC (Release 17)", 3GPP TR 37.817, V0.2.0, May 2021, pp. 1-11.

Rodoshi et al., "A Survey on Applications of Deep Learning in Cloud Radio Access Network", IEEE Access, vol. 09, 2021, pp. 61972-61997.

"(TP for TR 37.817): Standards Impacts for the AI/ML Energy Saving Use Case", 3GPP TSG-RAN WG3 Meeting #113-e, R3-213894, Agenda: 18.4, Nokia, Aug. 16-26, 2021, 5 pages.

International Search Report and Written Opinion received for corresponding Patent Cooperation Treaty Application No. PCT/EP2022/069902, dated Nov. 4, 2022, 14 pages.

"AI/ML for energy efficiency use case discussion", 3GPP TSG-RAN WG3 Meeting #112-e, R3-212315, Agenda: 18.3, Ericsson, May 17-27, 2021, 10 pages.

* cited by examiner

ENERGY SAVING IN MOBILE COMMUNICATION SYSTEMS

RELATED APPLICATION

This application was originally filed as PCT Application No. PCT/EP2022/069902 on 15 Jul. 2022, which claims priority from Finland Application No. 20215837, filed on 4 Aug. 2021, each of which is incorporated herein by reference in its entirety.

FIELD

The present specification relates to energy saving; for example, to energy saving in mobile communication systems.

BACKGROUND

Energy saving functionality can be provided in mobile communication systems in order to reduce energy consumption and energy-related operational expenditure. Energy saving deployments may consider capacity booster cells that are deployed on top of coverage cells to enhance capacity for E-UTRA or New Radio (NR) in single or dual connectivity. Energy consumption may be reduced by switching such capacity cells off when capacity is not needed and re-activating the cells on demand. Switching off a cell can be done by an operation, administration and maintenance (OAM) module and by an NG-RAN node owning the capacity cell which can autonomously switch the cell off, for example using cell load information.

An NG-RAN node can initiate handover to offload traffic from a cell that is being switched off. Neighbouring nodes may be informed over an Xn link by the owner of the cell about the switch off decision. Idle mode user equipments (UEs) can be prevented from camping on a cell that is switched off and incoming handovers can be prevented. Neighbouring cells can retain cell configuration data even when a cell is inactive. An NG-RAN node not owning capacity booster cells can request re-activation of a capacity cell from a neighbour over an Xn link if there is a need for such capacity. Neighbours are also informed over Xn about the switch on (reactivation) decision over Xn interface. Switch-on can also be decided by the OAM module.

An NG-RAN node may perform autonomous switch-off of its cells. An NG-RAN node can also request re-activation of a list of cells owned by a neighbour. This can be configured to an NG-RAN node by the operator. An OAM module may also configure policies for a switch-off action at an NG-RAN node or for re-activation of a switched-off cell.

To quantify the amount of energy saving, a measure of energy efficiency of base stations is defined by ETSI ES 203 228 ("Environmental Engineering (EE); Assessment of mobile network energy efficiency") as the ratio of two KPIs, the Data Volume (DVMN) over the energy consumption (ECMN):

$$EE_{MN,DV} = \frac{DV_{MN}}{EC_{MN}}$$

SUMMARY

In a first aspect, this specification describes an apparatus (e.g. an operation, administration and maintenance (OAM) module) comprising means for performing: receiving a first energy saving report from a local node in control of a first layer (e.g. a capacity layer, such as a capacity layer of a gNB) of a mobile communication system, wherein the first energy saving report comprises load and timing information relating to said first layer; generating an energy saving decision for said first layer, wherein the energy saving decision comprises an energy saving pattern for the first layer and a qualification for the decision; and providing the energy saving decision to said local node in control of said first layer.

Some example embodiments further comprise means for performing: receiving a second energy saving report from a node in control of a second layer (e.g. a coverage layer) of the mobile communication system.

Some example embodiments further comprise means for performing: determining which cells of the first layer should be turned on or off; and generating said energy saving decision accordingly.

The apparatus may further comprise a first machine learning model for generating said energy saving decision. Some example embodiment further comprise means for performing: receiving feedback information from the first layer regarding energy saving decision performance; and training (e.g. using reinforcement learning) the first machine learning model based on said feedback information.

In some example embodiments, each qualification may comprise: a request, indicating that the respective energy saving decision is a hard decision to be implemented at the respective first layer; or a recommendation, indicating the respective energy saving decision is a qualified soft decision to be implemented at the respective first layer at the discretion of the local node in control of the respective first layer. Some or all energy saving decisions may include a recommendation qualification further comprise an indication of a reward for implementing the respective energy saving pattern.

In some example embodiments, each energy saving pattern may comprise information relating operational states of the local node.

In a second aspect, this specification describes apparatus (e.g. a radio access network (RAN) or gNB) comprising means for performing: providing an energy saving report relating to a first layer of a mobile communication system to a control node (such as an OAM) of the mobile communication system, wherein the first energy saving report comprises load and timing information relating to said first layer; receiving an energy saving decision at a local node in control of said first layer from said control node, wherein the energy saving decision comprises an energy saving pattern for the first layer of and a qualification for said energy saving decision; and determining whether to implement the energy saving decision based, at least in part, on the qualification for said energy saving decision. The first layer maybe a capacity layer, such as a capacity layer of a gNB.

Some example embodiments further comprise means for performing: providing an energy saving decision response to the control node in response to the received energy saving decision, wherein the energy saving decision response indicates a reason for the determination made at the local node in control of said first layer.

The apparatus may further comprise a second machine learning model for determining whether to implement said energy saving decision and means for performing training the second machine learning model (e.g. using reinforcement learning).

In some example embodiments, each qualification comprises: a request, indicating that the respective energy saving decision is a hard decision to be implemented at the respective first layer; or a recommendation, indicating the respective energy saving decision is a qualified soft decision to be implemented at the respective first layer at the discretion of the local node in control of the respective first layer. Some or all energy saving decisions may include a recommendation qualification further comprise an indication of a reward for implementing the respective energy saving pattern.

In some example embodiments, each energy saving pattern comprises information relating operational states of the local node.

In a third aspect, this specification describes an apparatus comprising a control node of a mobile communication system and one or more local nodes of the mobile communication system. The control node comprises means for performing: receiving an energy saving report from one or more local nodes in control of one or more first layers, wherein each energy saving report comprises load and timing information relating to the respective first layer; generating an energy saving decision for at least some of said first layers, wherein each energy saving decision comprises an energy saving pattern for the respective first layer and a qualification for the decision; and providing said energy saving decisions to the respective local nodes. Some or all of the local nodes comprise means for performing: providing the respective energy saving report relating to the respective first layer to said control node; receiving the respective energy saving decision; and determining whether to implement the respective energy saving decision based, at least in part, on the qualification for said energy saving decision. The first layer maybe a capacity layer, such as a capacity layer of a gNB.

In some example embodiments, each qualification comprises: a request, indicating that the respective energy saving decision is a hard decision to be implemented at the respective first layer; or a recommendation, indicating the respective energy saving decision is a qualified soft decision to be implemented at the respective first layer at the discretion of the local node in control of the respective first layer. Some or all energy saving decisions may include a recommendation qualification further comprise an indication of a reward for implementing the respective energy saving pattern.

In some example embodiments, each energy saving pattern comprises information relating operational states of the local node.

In any of the first to third aspects, the means may comprise: at least one processor; and at least one memory including computer program code, the at least one memory and computer program code configured to, with the at least one processor, cause the performance of the apparatus.

In a fourth aspect, this specification describes method comprising: receiving a first energy saving report from a local node in control of a first layer (e.g. a capacity layer, such as a capacity layer of a gNB) of a mobile communication system, wherein the first energy saving report comprises load and timing information relating to the first layer; generating an energy saving decision for said first layer, wherein the energy saving decision comprises an energy saving pattern for the first layer and a qualification for the decision; and providing the energy saving decision to said local node in control of said first layer.

The method may comprise receiving a second energy saving report from a node in control of a second layer (e.g. a coverage layer) of the mobile communication system. The method may comprise: determining which cells of the first layer should be turned on or off; and generating said energy saving decision accordingly.

In a fifth aspect, this specification describes method comprising: providing an energy saving report relating to a first layer of a mobile communication system to a control node (such as an OAM) of the mobile communication system, wherein the first energy saving report comprises load and timing information relating to said first layer; receiving an energy saving decision at a local node in control of said first layer from said control node, wherein the energy saving decision comprises an energy saving pattern for the first layer of and a qualification for said energy saving decision; and determining whether to implement the energy saving decision based, at least in part, on the qualification for said energy saving decision. The first layer maybe a capacity layer, such as a capacity layer of a gNB. The method may comprise: providing an energy saving decision response to the control node in response to the received energy saving decision, wherein the energy saving decision response indicates a reason for the determination made at the local node in control of said first layer.

In a sixth aspect, this specification describes an apparatus configured to perform (at least) any method as described with reference to the fourth or fifth aspects.

In a seventh aspect, this specification describes computer-readable instructions which, when executed by a computing apparatus, cause the computing apparatus to perform (at least) any method as described with reference to the fourth or fifth aspects.

In an eighth aspect, this specification describes a computer-readable medium (such as a non-transitory computer-readable medium) comprising program instructions stored thereon for performing (at least) any method as described with reference to the fourth or fifth aspects.

In a ninth aspect, this specification describes an apparatus comprising: at least one processor; and at least one memory including computer program code which, when executed by the at least one processor, causes the apparatus to perform (at least) any method as described with reference to the fourth or fifth aspects.

In a tenth aspect, this specification describes a computer program comprising instructions for causing an apparatus to perform at least the following: receiving a first energy saving report from a local node in control of a first layer (e.g. a capacity layer, such as a capacity layer of a gNB) of a mobile communication system, wherein the first energy saving report comprises load and timing information relating to the first layer; generating an energy saving decision for said first layer, wherein the energy saving decision comprises an energy saving pattern for the first layer and a qualification for the decision; and providing the energy saving decision to said local node in control of said first layer.

In an eleventh aspect, this specification describes a computer program comprising instructions for causing an apparatus to perform at least the following: providing an energy saving report relating to a first layer of a mobile communication system to a control node (such as an OAM) of the mobile communication system, wherein the first energy saving report comprises load and timing information relating to said first layer; receiving an energy saving decision at a local node in control of said first layer from said control node, wherein the energy saving decision comprises an energy saving pattern for the first layer of and a qualification for said energy saving decision; and determining whether to implement the energy saving decision based, at least in part, on the qualification for said energy saving decision. The first layer maybe a capacity layer, such as a capacity layer of a gNB.

In a twelfth aspect, this specification describes an apparatus comprising: an input of a control node (or some other means) for receiving a first energy saving report from a local node in control of a first layer (e.g. a capacity layer, such as a capacity layer of a gNB) of a mobile communication system, wherein the first energy saving report comprises load and timing information relating to the first layer; generating an energy saving decision for said first layer, wherein the energy saving decision comprises an energy saving pattern for the first layer and a qualification for the decision; and an output of the control node (or some other means) for providing the energy saving decision to said local node in control of said first layer.

In a thirteenth aspect, this specification describes an apparatus comprising: an output of a local node (or some other means) for providing an energy saving report relating to a first layer of a mobile communication system to a control node (such as an OAM) of the mobile communication system, wherein the first energy saving report comprises load and timing information relating to said first layer; an input of the local node (or some other means) in control of said first layer for receiving an energy saving decision from said control node, wherein the energy saving decision comprises an energy saving pattern for the first layer of and a qualification for said energy saving decision; and a control module (or some other means) for determining whether to implement the energy saving decision based, at least in part, on the qualification for said energy saving decision. The first layer maybe a capacity layer, such as a capacity layer of a gNB.

BRIEF DESCRIPTION OF DRAWINGS

Example embodiments will now be described, by way of non-limiting examples, with reference to the following schematic drawings, in which.

DETAILED DESCRIPTION

Figure 1:
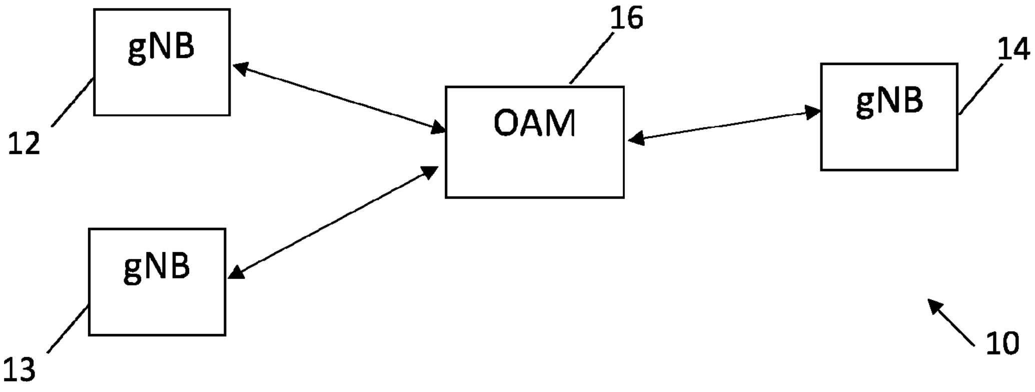
FIG. 1 is a block diagram of a mobile communication system in accordance with an example embodiment.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

There remains a need for further developments in the fields of energy saving, load balancing, mobility optimisation, traffic steering and the like. In the recent years, Machine Learning (ML) techniques, a branch of Artificial Intelligence (AI), has received a lot of attention as a potential driver in optimization and automation. AI/ML has the capability to simplify and solve complicated problems by analyzing large volumes of data and by identifying conditions for different algorithms to operate efficiently and effectively. AI/ML shows also potential for optimizing network functions by processing the large volumes of data available within an operator's network and may provide additional intelligence for the energy saving actions of the network nodes.

FIG. 1 is a block diagram of a mobile communication system, indicated generally by the reference numeral 10, in accordance with an example embodiment. The system 10 comprises a first gNB 12, a second gNB 13, a third gNB 14 and an OAM 16. In addition to coverage cells, one or more of the gNBs 12 to 14 include capacity (or booster) cells that may be used to enhance capacity, as discussed above. As another possible implementation alternative, some of the gNBs may only comprise coverage cells and may use the capacity cells of their neighbours upon request. In one example, the first gNB 12 may comprise both coverage and capacity cells while the second gNB 14 may have only coverage cells under its control. The OAM 16 may take decisions regarding whether any such capacity cells should be turned off to save energy or turned on to increase capacity.

OAM and radio access network (RAN) nodes have different levels of information to make energy saving decisions. An OAM module (such as OAM 16) receives (non real-time) counters, Key Performance Indicators (KPIs), and alarms from the full network, whilst RAN modules receive (real-time or near real-time) UE measurements, own load measurements (e.g. radio load, TNL load), load measurements from neighbour gNBs, etc. In general terms, the OAM module has a broader view of the network performance received at a longer time scale as opposed to RAN that has a narrower view (but on a more real-time scale). Thus, OAM and RAN can have different views on which cells should be switched-off or switched-on. This can create conflicts in the network. For instance, if RAN and OAM operate without coordination, it may happen that OAM tells a cell that it should be switched off but a neighbour NG-RAN node may have needed it activated.

Figure 2:
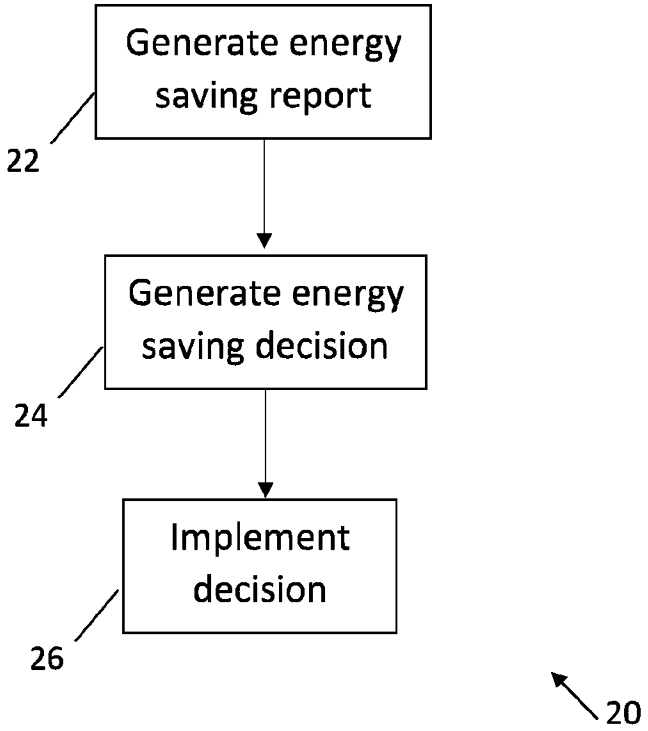
FIGS. 2 to 4 are flow charts showing algorithms in accordance with example embodiments.

FIG. 2 is a flow chart showing an algorithm, indicated generally by the reference numeral 20, in accordance with an example embodiment. The algorithm 20 may be implemented by the system 10.

The algorithm 20 starts at operation 22, where an energy saving report is generated (for example at one or more of the gNBs 12 to 14). As discussed in detail below, the energy saving report comprises information relating to the operation of the relevant node. The generated energy saving report may be sent to the relevant decision making mode (e.g. the OAM 16)

At operation 24, an energy saving decision is made at the OAM 16 (e.g. on receipt of the energy saving report). The energy saving decision may comprise an energy saving pattern for a capacity layer of a gNB. As discussed in detail below, in order to generate the energy saving decision, the OAM 16 may calculate which cells should be switched off and, optionally, for how long. The OAM 16 may also calculate when a cell that is switched off must be switched on again and optionally for how long. As another alternative, the OAM may indicate that a cell will be switched on through a likelihood/probability that a cell will be needed again for one or more time intervals. The capacity layer gNB may use this information to proactively switch off or on the cell.

At operation 26, the energy saving decision is implemented by the respective gNB.

The algorithm 20 therefore provides an energy saving mechanism based on switching-off NG-RAN capacity cells and a possible indication of a time or a probability when a cell will be needed again in the future under OAM control.

Figure 3:
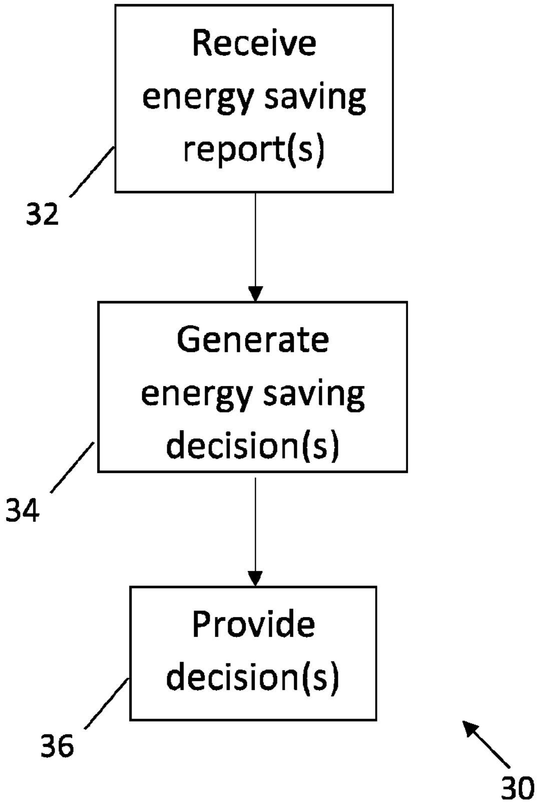

FIG. 3 is a flow chart showing an algorithm, indicated generally by the reference numeral 30, in accordance with an example embodiment. The algorithm 30 may be implemented at the OAM 16 of the system 10 described above.

The algorithm 30 starts at operation 32, where an energy saving report is received from a first layer (e.g. a capacity or booster layer) of a node of a mobile communication system. The first energy saving report comprises load and timing information relating to the first layer of said node. For example, the energy saving report may include one or more of:

- Load or predicted load information regarding the cells of the first layer (e.g. capacity layer) of the gNB from RAN.
- Predicted/estimated timing information (in terms of a period or of a probability) when cells can be switched off.
- Expected capacity layer power consumption (or energy efficiency) at the expected load levels.

The OAM 16 may also receive from a second layer (e.g., a coverage layer) a second energy saving report including an estimate of additional traffic to be handled in the event that a capacity cell is switched off. This estimate can also be an outcome of an ML algorithm running at the coverage layer. In addition, an energy efficiency metric for the "delta" traffic, namely the additional traffic to be handled, may be provided. The additional traffic or the energy efficiency metric for this additional traffic could be seen as an expected "reward" or "cost" for this decision.

At operation 34, an energy saving decision for the first layer of said node is generated at the OAM. The energy saving decision comprises an energy saving pattern for the first layer of said node and a qualification for the decision. As discussed further below, the qualification may take the form of a "recommendation" (that may or may not be implemented by the respective node) or a "request" (that is expected to be followed). For instance, OAM may send a recommendation for an energy saving action in cases when it is not absolutely confident that the ML Algorithm running internally is trained sufficiently well. This may be the case if the OAM hasn't received enough measurements for training an Energy Saving ML algorithm. It can also request a gNB to follow an Energy Saving decision if it has high confidence that this is the best energy saving solution.

At operation 36, the energy saving decision generated in the operation 34 is provided to the first layer of the respective node (e.g. to a capacity cell of a gNB). As discussed further below, the energy saving decision may comprise an energy saving pattern comprising information relating operational states (e.g. when to turn a capacity cell off and when to turn it back on again).

Figure 4:
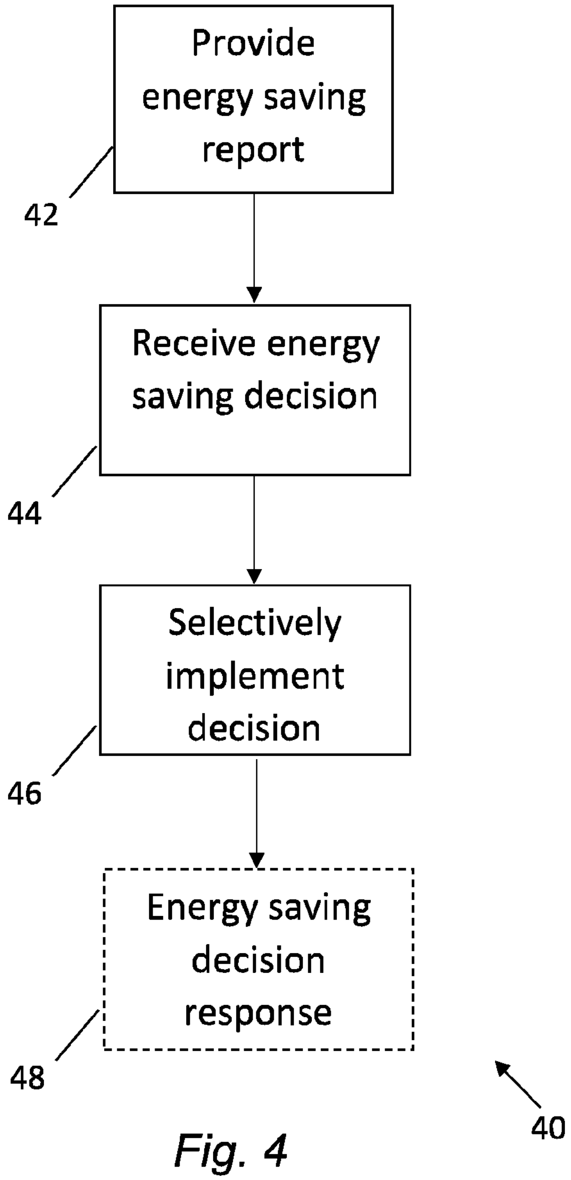

FIG. 4 is a flow chart showing an algorithm, indicated generally by the reference numeral 40, in accordance with an example embodiment.

The algorithm 40 starts at operation 42, where an energy saving report relating to a first layer (e.g. a capacity cell) of a node of mobile communication system is sent to a control node (e.g. the OAM 16) of the mobile communication system. The energy saving report comprises information relating to said first layer, as discussed further below. The energy saving report may also comprise information relating to the said second layer related to the coverage cells of a gNB. The energy saving report provided in the operation 42 may be received by an OAM in the operation 32 described above.

By way of example, the information included in each energy saving report may comprise one or more of the following:

- an indication of cells of the mobile communication system that serve high priority traffic. This indication can be given through the respective cell identity or list of cell identities;
- an indication of cells of the mobile communication system that are used for emergency calls. This indication can be given through the respective cell identity or list of cell identities;
- an indication of cells of nodes of the mobile communication system that should not be turned off. This may comprise one or more such cells of the capacity layer. This information may be given as a cell or as a list of cells;
- a current load status of one or more cells of nodes of the mobile communication system;
- neighbouring cells of the one or more nodes of the mobile communication system;
- a predicted future load status of one or more cells of nodes of the mobile communication system at an indicated time in the future. Additionally, an estimate (prediction) of additional traffic that relates to an energy saving decision (cell switch off) can be indicated;
- an expected capacity layer power consumption (or energy efficiency or any other metric measuring the saving in energy) at the expected load levels.

At operation 44, an energy saving decision is received at the first layer of said node from said control node (OAM). The energy saving decision comprises an energy saving pattern and a qualification for said energy saving decision. The energy saving pattern may, for example indicate when to turn a capacity cell on/off. Additionally, the energy saving pattern may for example indicate when to turn a capacity cell on/off and for how long.

At operation 46, a determination is made regarding whether to implement the energy saving decision received in the operation 44. The energy saving decision may be selectively implemented based, for example, on the qualification for said energy saving decision. As discussed further below, possible qualifications include recommendation and requests, which may be handled differently.

At operation 48, an energy saving decision response is provided to the control node in response to the received energy saving decision. The energy saving decision response may indicate a reason for the determination made in the operation 46 (e.g. an indicating regarding why an energy saving decision was or was not followed). It should be noted that the operation 48 may be omitted in some example embodiments.

Figure 5:
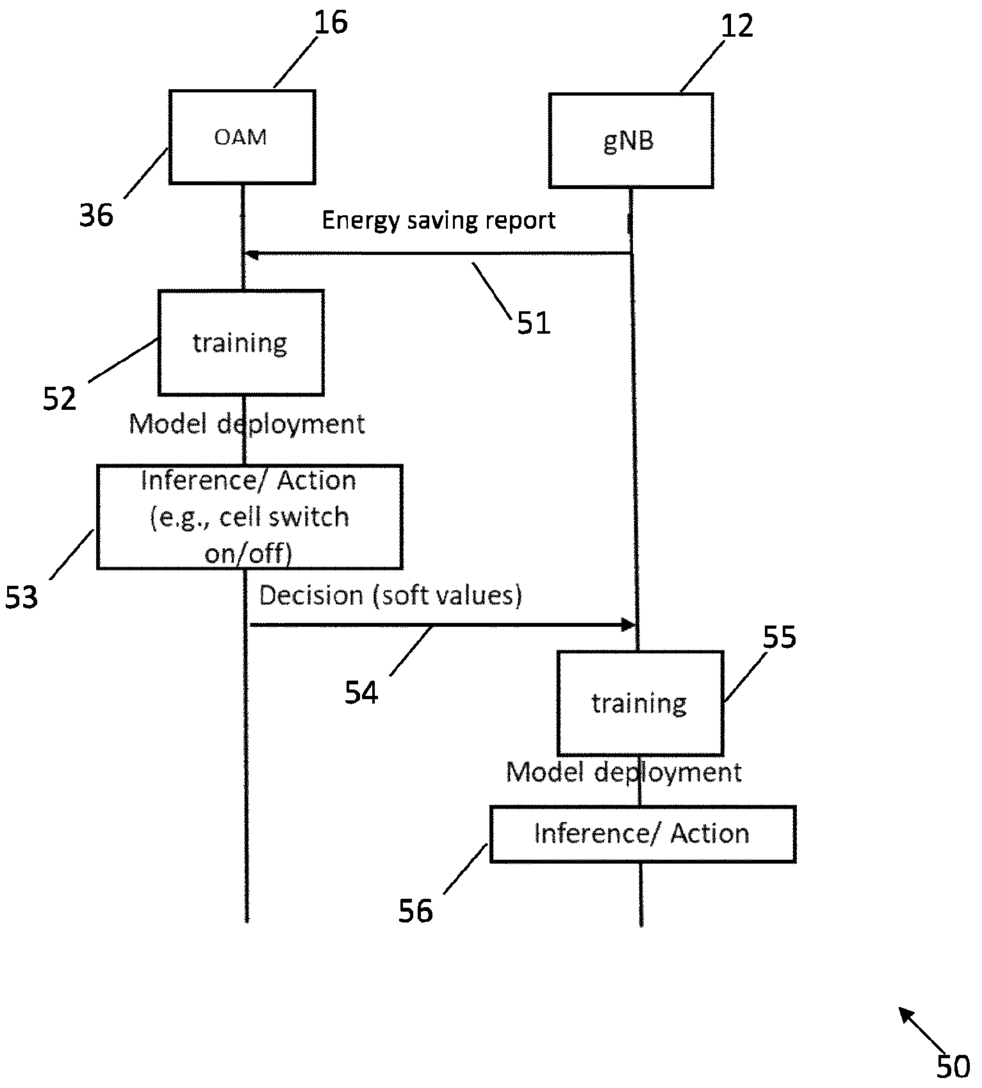
FIGS. 5 to 8 show message sequences in accordance with example embodiments.

FIG. 5 shows a message sequence, indicated generally by the reference numeral 50, in accordance with an example embodiment. The message sequence 50 shows message exchanges between the first gNB 12 and the OAM 16 of the system 10 described above.

The message sequence 50 starts with a first message 51 being sent from the gNB 12 to the OAM 16. The first message 51 includes information that can help OAM take an energy saving decision. The first message may be an energy saving report, and may include information such as the load, timing and power consumption data discussed above. This information can act as training data for an energy saving ML algorithm located at the OAM.

The information of first message 51 is used, in operation 52, to train a first machine learning model at the OAM 16. The information included in the first message 51 represents feedback information from the gNB 12 regarding energy saving decision performance of previous energy saving actions. Note that even though in the example message sequence 50, the energy saving report is sent from gNB 12 this is only an example embodiment. Information may be gathered at the OAM from a plurality of gNBs and a plurality of layers (coverage and capacity layers). The first machine learning model is trained (for example using reinforcement learning or supervised learning or any other type of learning) based on the feedback information.

Once trained, the model is deployed and used to generate (in operation 53) an energy saving decision. That decision is provided (e.g. as a soft decision) to the gNB 12 in message 54 (thereby implementing operation 36 of the algorithm 30 described above).

The gNB 12 includes a second machine learning model for determining whether to implement the energy saving decision provided in the message 54. At operation 55, the second machine learning model is trained, for example based on feedback information related to the performance of previous decisions. Training of the second machine learning model at a gNB can also use information available from load predictions received by the neighbouring gNBs. Once trained, the model is deployed (at operation 56) and used to determine whether to implement the decision provided in the operation 54 when the latter is given as a recommendation (thereby implementing the operation 46 of the algorithm 40).

The message sequence 50 can be repeated many times; thus, iterative training of the first and second machine learning models can be implemented by the operations 52 and 55.

Figure 6:
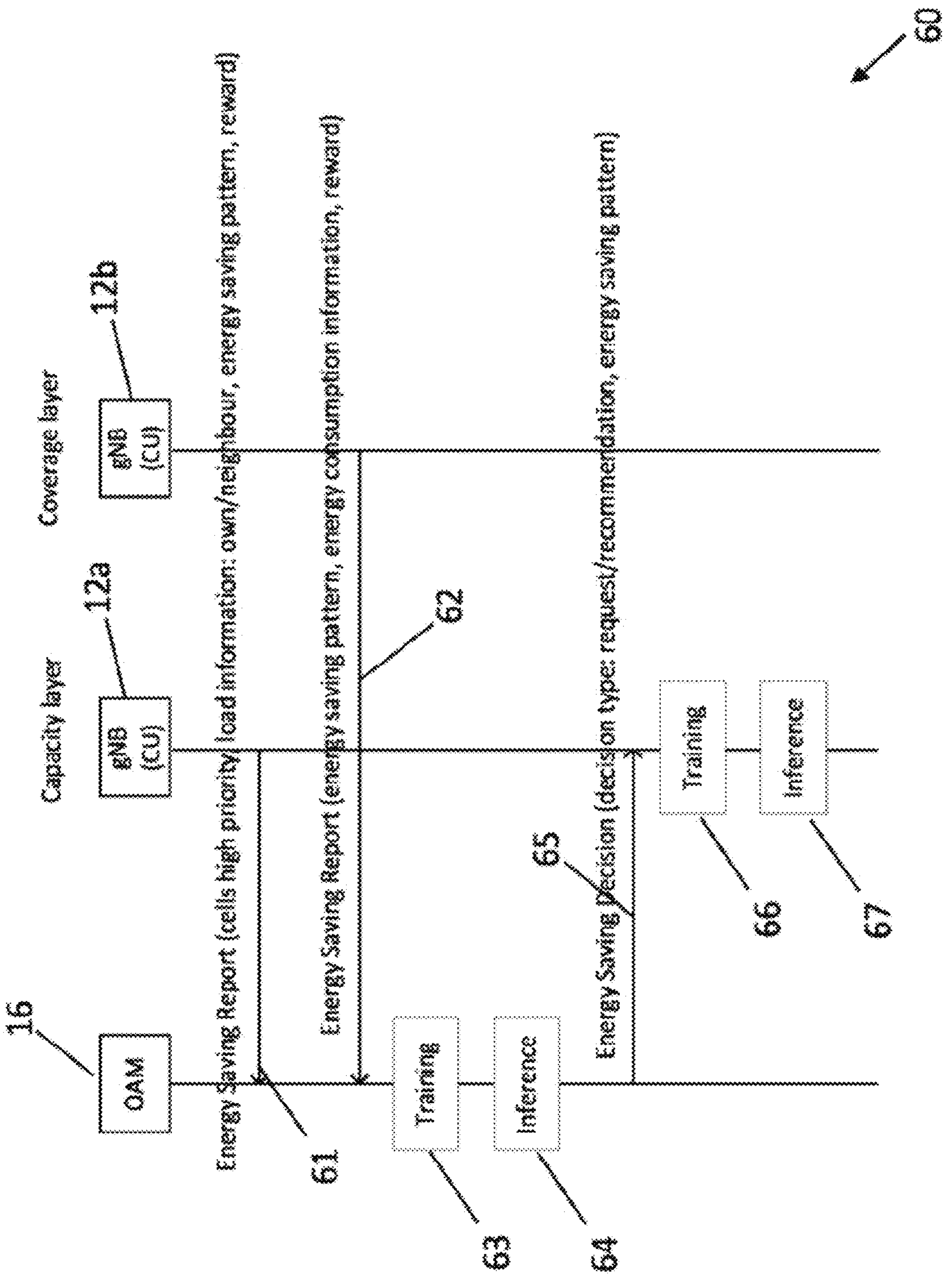

FIG. 6 shows a message sequence, indicated generally by the reference numeral 60, in accordance with an example embodiment. The message sequence 60 shows messages exchanged between a capacity layer 12*a*, a coverage layer 12*b* and the OAM 16 of the system 10 described above. The capacity layer 12*a* and the coverage layer 12*b* may together form part of the first gNB 12.

The capacity layer 12*a* signals to the OAM 16 guidance information that can help the OAM to decide about switching-on or switching-off one or more of the cells of the capacity layer. This can be implemented in a message 61 that provides an energy saving report (thereby implementing the operation 42 of the algorithm 40). The energy saving report may include data such as the gNB's current traffic situation (e.g. cells that serve high priority traffic, cells used for emergency calls, etc), a set of cells that should not be switched off, current load situation of the gNB (own cell, neighbour cells), a notification of cells that do not need to be activated etc.

For cells for which switch-off is needed, the gNB could additionally provide to the OAM (as part of the message 61) an estimated switch-on/off time indication. The time indication may be provided with respect to a time window that could be calculated based on predicted mobility and load distribution of users in its cells.

In some example embodiments, the gNB may provide to the OAM an on/off pattern (cycle) valid for a certain time interval. As another alternative, the estimated switch-off time can be provided to the OAM in terms of a probability of switching-off certain cells (e.g., "probability that a certain cell of the gNB will be off in a certain time window" as opposed to "a certain cell of the gNB will be off in a certain time window"). Information about the estimated traffic to be offloaded to the coverage layer during this time window (e.g. throughput, data volume, QoS) applicable for the time window(s) may be provided. The assumption is that the traffic that is not handled at capacity layer will be handled at coverage layer.

In addition to the switch-off time indication (e.g. in terms of a duration or a pattern of switch-off time succeeded by the time the cell will be (or is expected to be) switched-on), a gNB can provide to the OAM (as part of the message 61) an expected reward associated with this timing. For example, a fixed reward may be sent along with the switch-off timing indication towards the OAM. This can be interpreted by the OAM that for the given timing indicating one or more cells to be switched off (e.g., with a given pattern, duration etc.), the indicated fixed reward will be gained. Alternatively, the reward can be given proportionally to the switch-off duration, namely the higher the amount of time (duration) that a cell can be switched off, the higher the reward. If the switch-off duration is complemented by a probability, then the final reward can be the provided value multiplied by the probability of cell switch-off. Different switch-on and switch-off patterns of cells, with possibly timing information, can be provided by the gNB to the OAM with associated rewards for each such energy saving pattern alternatives. The reward may have a second component to indicate the performance gain or loss from previous energy saving actions of cell switch-ons and cell switch-offs at the capacity layer of the gNB. Such a reward can act as a feedback towards the OAM for subsequent energy saving decisions. Such reward may further be used in the (re)training process at the OAM. So, reward may refer to both the actual impact of a previous energy saving action as well as an (expected) reward for different future cell switch-on and switch-off decisions.

The coverage layer 12*b* signals to the OAM 16 (in a message 62) in the energy saving report guidance information about the estimated energy consumption for additional traffic it will need to support (when one or more cells of the capacity layer are switched-off). The additional traffic from an energy saving action could be reflected in the reward provided in the energy saving report. The reward should be such to penalize increases in the additional traffic for a given energy saving. The energy efficiency for the "delta traffic", e.g. number of bits/J for the additional traffic taken over from the capacity cell, can be also accounted for as part of the energy consumption information inside the energy saving report. Other metrics or utility functions of energy efficiency/consumption such as J/bit could also be used. Reward could also be mapped to the energy efficiency metric provided in the Energy Saving Report to favour more energy efficient actions.

The OAM 16 trains and executes a machine learning (ML) model in the operations 63 and 64 respectively. Similarly, the capacity layer gNB 12*a* trains and executes a machine learning (ML) model in the operations 66 and 67 respectively. The models may be trained using reinforcement learning or supervised learning, as discussed further below.

The OAM 16 decides how long the indicated cells should be switched off by taking collective information into account, i.e., information available at OAM and information sent by the gNB (e.g. by the capacity and coverage layers of the gNB). The OAM 16 generates an energy saving decision, which is sent to the capacity layer 12*a* in message 65. The energy saving decision includes a qualification of the decision, namely whether it is a request or a recommendation. As discussed further below, a "request" indicates that the OAM is sending a hard switch-off decision of certain cells in the capacity layer 12*a* and a "recommendation" means that the OAM is sending a soft switch-off decision allowing the capacity layer 12*a* to decide otherwise. This recommendation by the OAM may trigger the activation of an ML algorithm to be executed (and/or trained) at the gNB. Feedback from ML inference at a gNB towards OAM can be useful to improve the OAM's understanding on the optimal energy saving decision.

The OAM 16 may further indicate (in the message 65) a probability or likelihood that a cell will be needed again within a certain time interval. The OAM 16 may use the decision 65 to train the ML model 65 and may run inference on it; however, other internal algorithms can be used also that are not ML dependent.

When the capacity layer gNB 12*a* completes an action, it may signal to the OAM 16 feedback about the actual time duration it switched off its cell(s). This is information that would be unknown to the OAM if it only gave gNB a recommendation.

The coverage layer gNB 12*b* also signals to OAM 16 feedback about the actual amount of additional energy consumed.

The decisions and feedback between the OAM 16 and gNB layers 12*a* and 12*b* enable those entities to train their ML models (e.g. using reinforcement learning) based on each other's decisions. As an example:

- OAM timing indication to a gNB (e.g. in terms of a duration) can be interpreted differently by the gNB after a certain number of rounds when the latter learns what is the best decision it shall take based on OAM recommendations and its own actions. So a gNB can scale differently OAM timing indications.
- Actual decisions by the capacity layer 12*a* and their impact on the coverage layer 12*b* can be used by the OAM 16 to update its training/inference decisions.

Consider the following example. The OAM 16 provides a recommendation of cells to be activated or switched off to the gNB 12. This accounts to a soft decision on behalf of OAM. The decision may be communicated in different ways, for example:

- As a likelihood/probability/fraction of time that certain cells at the gNB can stay offline during a given time interval
- An offline time period, an on/off pattern, a time to turn on a cell or a list of cells (with high chance) etc.

The OAM 16 makes this recommendation based on KPIs, measurements and other predictions from gNBs. The capacity layer 12*a* can take this recommendation into account when switching off its capacity cells and it can relate the soft value to an actual need to turn off. Alternatively, the capacity layer 12*a* could ignore this recommendation. In this latter case, the capacity layer 12*a* may respond to the OAM 16 with the different decision it took and the impact of its decision (an effect of the action or a certain reward). Additionally, the capacity layer 12*a* could indicate to the OAM a reason why the recommendation was not followed (thereby implementing the operation 46 of the algorithm 40 described above). An OAM that receives feedback from the RAN can use that feedback to recalculate another recommendation.

Figure 7:
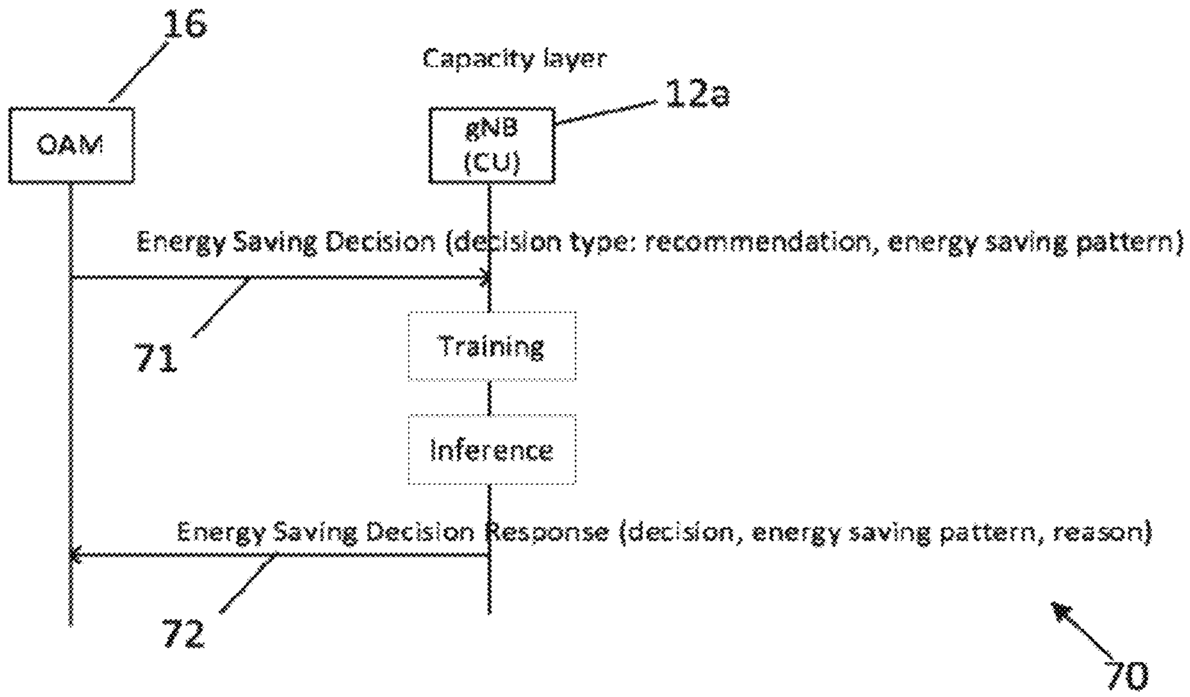

FIG. 7 shows a message sequence, indicated generally by the reference numeral 70, in accordance with an example embodiment. The message sequence 70 shows messages sent between the OAM 16 and the capacity layer 12*a* described above.

The message sequence 70 starts with an energy saving decision 71 being sent from the OAM 16 to the capacity layer 12*a*. The energy saving decision 71 includes a recommendation qualification indicating the energy saving decision is a soft decision to be implemented at the discretion of the capacity layer 12*a*. The energy saving decision 71 may further comprise an indication of a reward for implementing the respective energy saving pattern. The reward may, for example, indicate an expected benefit of the energy saving decision. An energy saving decision qualified as a recommendation can trigger activation of ML training and ML inference at a gNB for energy saving operations. This can be done explicitly (e.g., with an information element in the energy saving decision) or implicitly (e.g., when the gNB receives an energy saving decision qualified as a recommendation).

In response to the energy saving decision (and following possible training and inference steps, as discussed above), the capacity layer 12*a* sends an energy saving decision response 72 to the OAM 16. The response 72 may include an indication regarding whether the energy saving decision included in the message 71 was implemented or not and a reason for that decision.

Figure 8:
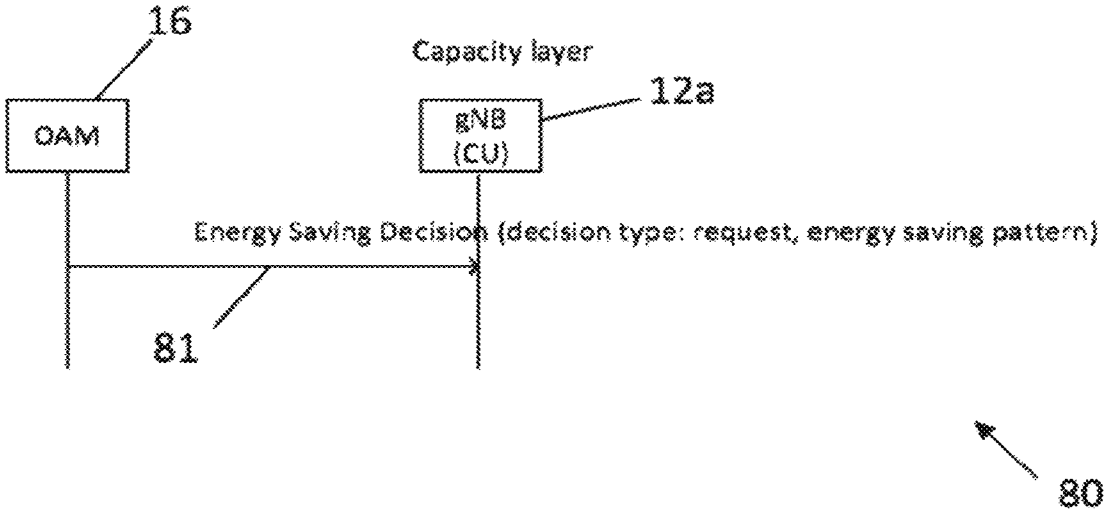

FIG. 8 shows a message sequence, indicated generally by the reference numeral 80, in accordance with an example embodiment. The message sequence 80 shows messages sent between the OAM 16 and the capacity layer 12*a* described above.

The message sequence 80 comprises an energy saving decision 81 sent from the OAM 16 to the capacity layer 12*a*. The energy saving decision 81 includes a request qualification, indicating that the energy saving decision is a hard decision to be implemented by the capacity layer 12*a*. The energy saving decision being a request can disable ML training and ML inference operations at a gNB from running; the gNB must follow the decisions instructed by the OAM. Disabling the training and inference operations can be done explicitly (e.g., with an information element in the energy saving decision) or implicitly (e.g., when the gNB receives an energy saving decision qualified as a request).

Figure 9:
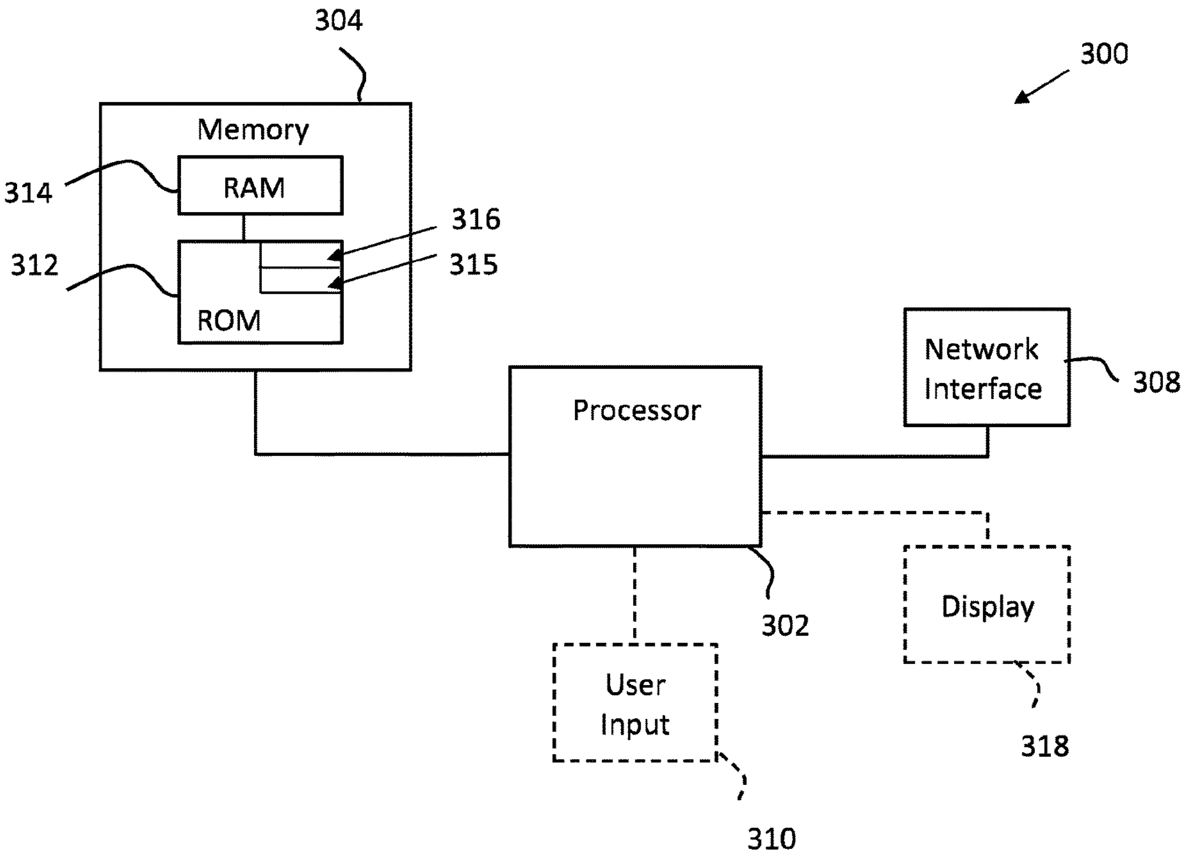
FIG. 9 is a block diagram of components of a system in accordance with an example embodiment.

For completeness, FIG. 9 is a schematic diagram of components of one or more of the example embodiments described previously, which hereafter are referred to generically as a processing system 300. The processing system 300 may, for example, be (or may include) the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms and sequences 20, 30, 40, 50, 60, 70 and 80 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 10:
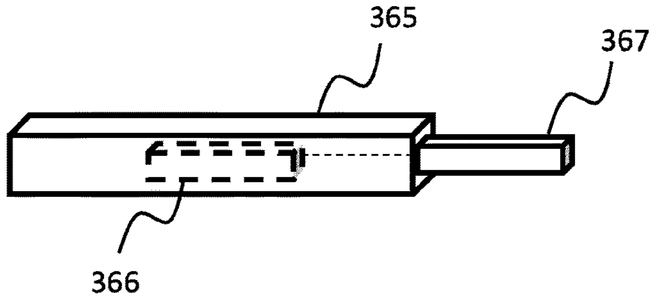
FIG. 10 shows tangible media storing computer-readable code which when run by a computer may perform methods according to example embodiments described above.

FIG. 10 shows tangible media, specifically a removable memory unit 365, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. Other forms of tangible storage media may be used. Tangible media can be any device/apparatus capable of storing data/information which data/information can be exchanged between devices/apparatus/network.

Example embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams and sequences of FIGS. 2 to 8 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

What is claimed is:

1. An apparatus, comprising:

at least one processor; and at least one memory storing instructions that, when executed by the at least one processor, cause the apparatus at least to:

receive, at an operations, administration and management (OAM) control node, a first energy saving report from a capacity layer of a gNB, the capacity layer being in control of a first layer of a mobile communication system, wherein the first energy saving report comprises load and timing information relating to said first layer, wherein the first layer comprises one or more capacity cells of the gNB, and wherein the first energy saving report comprises:

an indication of one or more cells that serve high priority traffic or emergency calls;

an indication of one or more cells of the capacity layer that should not be switched off;

a current load situation of the gNB including load information for at least one own cell and at least one neighboring cell;

an estimated switch-on/off time indication for at least one capacity cell, the estimated switch-on/off time indication being associated with a time window calculated based on predicted mobility and load distribution of users in cells of the gNB;

information about estimated traffic to be offloaded from the capacity layer to a coverage layer during the time window; and an expected reward associated with switching off the at least one capacity cell during the time window;

receive, from the coverage layer of the gNB, a second energy saving report comprising estimated energy consumption information for additional traffic to be supported by the coverage layer when the at least one capacity cell of the capacity layer is switched off;

train and execute a machine-learning model at the OAM control node using the first energy saving report, the second energy saving report, and feedback information indicating performance of one or more previous energy saving actions;

generate an energy saving decision for said first layer, wherein the energy saving decision comprises an energy saving pattern for the first layer and a qualification for the decision, wherein the energy saving pattern identifies the at least one capacity cell to be switched off and specifies at least one of an offline time period, an on and off pattern, or a probability that the at least one capacity cell will be needed again within a further time interval, and wherein the qualification is one of:

a recommendation indicating a soft switch-off decision that the capacity layer may selectively implement using machine-learning inference at the gNB; or a request indicating a hard switch-off decision that the capacity layer is required to implement and that disables machine-learning training and inference operations at the gNB for the energy saving decision;

provide the energy saving decision to said capacity layer of the gNB in control of said first layer; and receive, from the capacity layer of the gNB, an energy saving decision response indicating whether the energy saving decision was implemented and, when the energy saving decision was not implemented, a reason why the energy saving decision was not implemented, wherein the apparatus is comprised in the OAM control node of the mobile communication system.

2. A method, comprising:

receiving at an operations, administration and management (OAM) control node, a first energy saving report from a capacity layer of a gNB, the capacity layer being in control of a first layer of the mobile communication system, wherein the first energy saving report comprises load and timing information relating to the first layer, wherein the first layer comprises one or more capacity cells of the gNB, and wherein the first energy saving report comprises:

an indication of one or more cells that serve high priority traffic or emergency calls;

an indication of one or more cells of the capacity layer that should not be switched off;

a current load situation of the gNB including load information for at least one own cell and at least one neighboring cell;

an estimated switch-on/off time indication for at least one capacity cell, the estimated switch-on/off time indication being associated with a time window calculated based on predicted mobility and load distribution of users in cells of the gNB;

information about estimated traffic to be offloaded from the capacity layer to a coverage layer during the time window; and an expected reward associated with switching off the at least one capacity cell during the time window;

receive, from the coverage layer of the gNB, a second energy saving report comprising estimated energy consumption information for additional traffic to be supported by the coverage layer when the at least one capacity cell of the capacity layer is switched off;

train and execute a machine-learning model at the OAM control node using the first energy saving report, the second energy saving report, and feedback information indicating performance of one or more previous energy saving actions;

generating an energy saving decision for said first layer, wherein the energy saving decision comprises an energy saving pattern for the first layer and a qualification for the decision, wherein the energy saving pattern identifies the at least one capacity cell to be switched off and specifies at least one of an offline time period, an on and off pattern, or a probability that the at least one capacity cell will be needed again within a further time interval, and wherein the qualification is one of:

a recommendation indicating a soft switch-off decision that the capacity layer may selectively implement using machine-learning inference at the gNB; or a request indicating a hard switch-off decision that the capacity layer is required to implement and that disables machine-learning training and inference operations at the gNB for the energy saving decision;

providing the energy saving decision to said capacity layer of the gNB in control of said first layer; and receiving, from the capacity layer of the gNB, an energy saving decision response indicating whether the energy saving decision was implemented and, when the energy saving decision was not implemented, a reason why the energy saving decision was not implemented, wherein the apparatus is comprised in the OAM control node of the mobile communication system.

3. The method of claim 2, wherein the estimated energy consumption information in the second energy saving report comprises an energy efficiency metric for the additional traffic to be supported by the coverage layer, the energy efficiency metric comprising at least one of bits per joule or joules per bit.

4. The method of claim 3, wherein the information about the estimated traffic to be offloaded from the capacity layer to the coverage layer comprises at least one of throughput, data volume, or quality of service information applicable during the time window.

5. The method of claim 4, wherein the expected reward is proportional to a duration for which the at least one capacity cell is expected to be switched off during the time window.

6. The method of claim 5, wherein, when the estimated switch-on/off time indication comprises a probability of switching off the at least one capacity cell, the expected reward is determined by multiplying a reward value by the probability of switching off the at least one capacity cell.

7. The method of claim 6, wherein the first energy saving report comprises a plurality of candidate energy saving patterns for the at least one capacity cell, and wherein each candidate energy saving pattern is associated with a respective expected reward.

8. The method of claim 7, wherein training the machine-learning model at the OAM control node comprises training the machine-learning model using reinforcement learning based on feedback indicating an actual impact of a previous cell switch-on or cell switch-off action.

9. The method of claim 8, wherein the feedback information comprises at least one of: an actual time duration during which the at least one capacity cell was switched off; an actual amount of additional energy consumed by the coverage layer; an indication of whether a previous energy saving decision was implemented; or a reason why a previous energy saving decision was not implemented.

10. The method of claim 9, wherein, when the qualification is the recommendation, providing the energy saving decision to the capacity layer triggers activation of machine-learning training or machine-learning inference at the gNB for determining whether to implement the energy saving decision.

11. The method of claim 10, further comprising, when the energy saving decision response indicates that the energy saving decision was not implemented, recalculating, by the OAM control node, a further energy saving decision for the capacity layer based at least on the reason why the energy saving decision was not implemented.

* * * * *